Nov. 30, 1971   R. H. MOFFAT   3,623,281
MOUNTING FIXTURE
Filed June 16, 1969   6 Sheets-Sheet 1

ROBERT H. MOFFAT
INVENTOR
WHANN & McMANIGAL
BY Attorneys for Applicant

Nov. 30, 1971  R. H. MOFFAT  3,623,281
MOUNTING FIXTURE
Filed June 16, 1969  6 Sheets-Sheet 3

ROBERT H. MOFFAT
INVENTOR
WHANN & McMANIGAL
BY Attorneys for Applicant

United States Patent Office 3,623,281
Patented Nov. 30, 1971

3,623,281
MOUNTING FIXTURE
Robert H. Moffat, 8554 Nevada,
Canoga Park, Calif. 91304
Filed June 16, 1969, Ser. No. 833,637
Int. Cl. B24d 17/00
U.S. Cl. 51—377          15 Claims

ABSTRACT OF THE DISCLOSURE

Apparatus for mounting a replaceable sanding or grinding disk on the rotary drive shaft of a power device having a supporting hub provided with annularly arranged pockets and lugs, the pockets being adapted to receive projections on the disk, a gripping or clamping element having annularly arranged jaws being adapted to engage the projections of the disk, and means operable upon rotation of the shaft of the power device for causing the gripping or clamping means to grip or clamp the projections on the disk in order to securely mount the same on said hub.

PRIOR ART

Abrasive devices such as portable or mounted driving motors and sanding or grinding disks thereby are in common use throughout various industries. The disks are relatively low in price. They wear out in a short period of time and they, therefore, have to be replaced. It is common practice to have a mounting plate secured to the shaft of the power device and to secure the disks in place by securing a nut onto the end of the shaft and thus hold the disk against the hub. There are also disclosed in the patented art various types of "quick" attachment means designed for the purpose of reducing the time it takes to remove and install a sanding or grinding disk.

SUMMARY OF THE INVENTION

It is an object of my invention to provide mounting apparatus for removably securing a replacement element to a rotary drive element in which the parts are securely clamped together and which do not involve flexible or yieldable parts.

It is a further object of my invention to provide apparatus of this character having two sets of clamping or gripping elements which securely grip a portion of the replacement element and in which rotation of the rotary drive element increases the gripping force between the parts.

It is a further object of my invention to provide apparatus of the character referred to in which when the rotary drive element is deenergized and stops its rotation the clamping forces are released and it is very easy for the operator to remove the replaceable element and replace it with another one.

It is an object of my invention to provide apparatus of the character described in which there is a mounting hub or support means and a clamping or gripping means having portions between which an area or areas of the replaceable element may be inserted and in which the replaceable element is securely clamped in place upon rotation of the rotary drive element.

It is an object of my invention to provide a combination as referred to in the preceding paragraph in which there are spring means for returning the parts to non-clamping or gripping position when the rotary element ceases to rotate.

My invention provides a strong durable mounting device for releasably mounting an abrasive disk or abrasive wheel to the rotating shaft of the power device and provides a combination which is reliable and in which the disk may be quickly replaced.

It is a further object of my invention to provide a combination of fixture and disk in which those elements cooperate with each other to permit of a quick installation and quick removal of the disk on the fixture, and in which the disk when finally installed in place is securely gripped by suitable gripping or clamping means so that the disk is tightly secured to the fixture.

It is another object of my invention to provide a fixture and disk in which there are separate driving shoulders whereby the fixture may drive the disk.

It is another object of my invention to provide a unique detachable element or disk designed for easy and quick installment on a fixture.

It is still further object of my invention to provide an arrangement of the class described in which the element or disk to be installed on the fixture is provided with the separate driving shoulders whereby the fixture may drive the disk or element.

Other objects and advantages of my invention will be made evident during the course of the following detailed description of a preferred form of my invention.

DESCRIPTION OF THE FIRST EMBODIMENT

Figures 1, 2, 3, 3A:
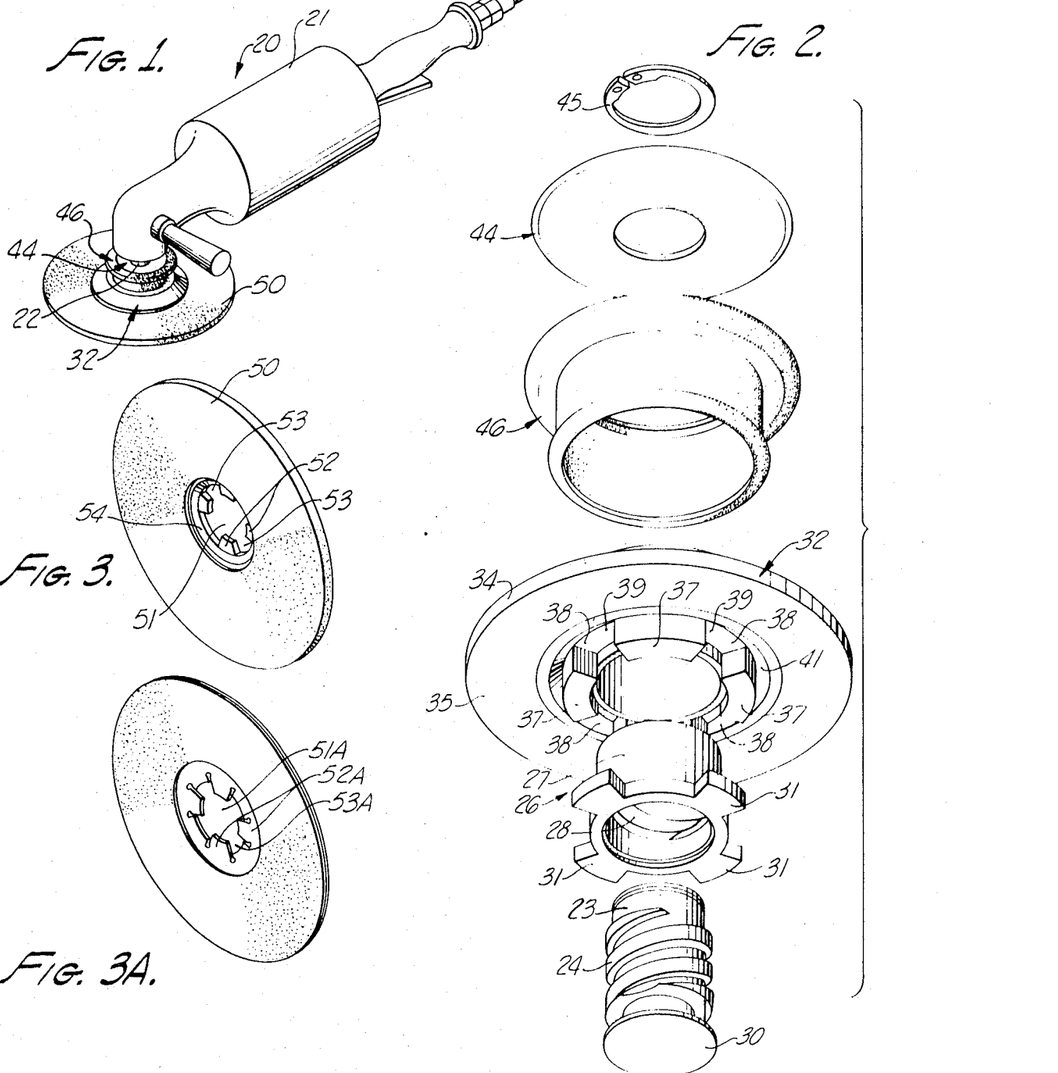
FIG. 1 is a perspective view illustrating my invention applied to a power device.
FIG. 2 is an expanded view showing the various elements which comprise my invention.
FIG. 3 is a perspective view showing a sanding or grinding disk adapted to be used in conjunction with my mounting fixture.
FIG. 3A is a perspective view of another type of disk adapted to be used in conjunction with my invention.

Referring first to FIG. 1, the numeral 20 represents a portable sanding or grinding device in which there is a housing 21 in which an air or electric motor is positioned, this motor driving a shaft 22 upon which the fixture of my invention is mounted.

As shown in FIGS. 4 to 11, and more particularly in FIGS. 4, 5, 7 and 8, my invention provides a bushing 23 which is threadedly secured to the threaded end of the shaft 22. This bushing 23 has triple threads 24 formed on its exterior cylindrical surface. The numeral 26 is a clamping or gripping element having a cylindrical portion 27 provided with triple threads 28 which mate with the threads 24. The open end of the clamping or gripping element is closed by a dust or dirt cover 30. The left end of the element 26 is provided with four radially extending and equally spaced jaws 31.

Upon rotation of the clamping or gripping element 26 relative to the bushing 23, the element 26 will move axially along the bushing. The threads 24 and 28 are of a sufficiently long pitch that pressure on the element 26 will cause it to rotate and move in an axial direction relative to the shaft 22. Also, rotation of the shaft relative to the element 26 will cause axial movement of the element along the shaft. These threads constitute a means operable upon relative rotation of the supporting means and the shaft or rotary drive element for causing gripping means, to be described shortly, to grip a portion of the disk and hold it securely in place. Long spiral splines or the equivalent could be substituted for the triple threads.

Carried on the cylindrical portion 27 is a supporting means or supporting hub 32 having a sleeve 33 and a flange 34, the flange 34 having an engagement face 35 against which the replacement element may be held. A portion of the supporting hub for convenience of manufacture may be made in the form of a plastic insert.

Figure 4:
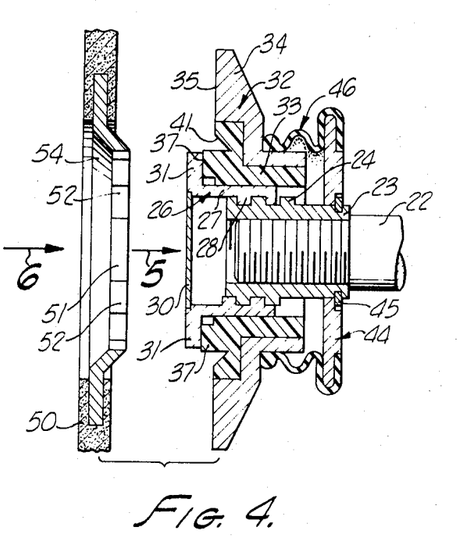
FIG. 4 is a vertical sectional view taken along the line 4—4 of FIG. 5 showing the mounting fixture of my invention with the parts ready to receive the replacement element or sanding or grinding disk, this view also showing the simple part of the grinding disk position adjacent to my invention and ready for assembly therewith.
Figure 5:
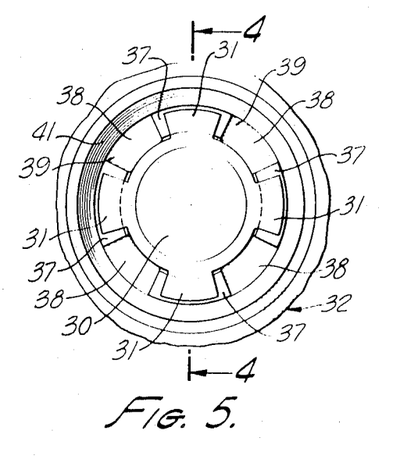
FIG. 5 is a fragmentary face view taken in the direction of the arrow 5 of FIG. 4, this view showing that pockets of the supporting means are exposed for the reception of lugs of the disk to be mounted.

The supporting hub 32 has annularly placed lugs or seals 37 as best shown in FIGS. 4 and 5, which are separated by annularly arranged pockets 38, which provide seating walls 39, and a surrounding conical cavity 41.

Figure 11:
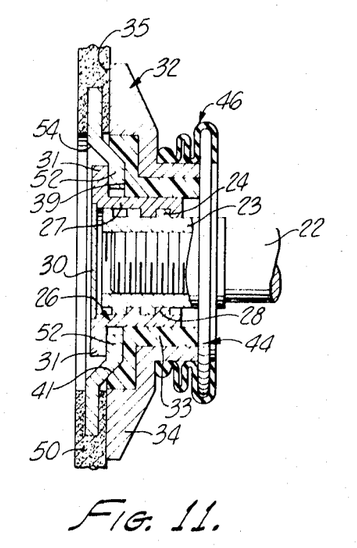
FIG. 11 is a sectional view as shown in FIG. 9 showing the position of the parts after the rotary drive element or shaft has been put into rotation by energizing the motor.

Secured to the right end of the bushing 23 is an abutment in the form of a radial plate 44, which is secured in place by a split washer 45. There is a rubber element 46 which is connected to the peripheral part of the abutment 44 and to the sleeve portion 33 of the supporting means 32, as shown, this rubber element comprising a spring and also an enclosure to keep foreign material away from the inner parts. If desired a metallic spring element could be used which could be molded in the rubber element or placed inside of it. The spring action of the element 46 exerts a force on the supporting means 32 in a leftward direction, which force is transferred through the lugs 32 to the clamping or gripping element 26. Because of the long pitch of the triple threads 24 and 28 the parts are resiliently retained in the position shown in FIG. 7 with the clamping or gripping element 26 in its most leftward position with respect to the bushing 23. The supporting means 32 is movable from a position spaced from the abutment 44, as shown in FIG. 4, into a position in which it engages the abutment 44 as shown in FIG. 11.

In the position shown in FIGS. 4, 5, 7 and 8, the four jaws 31 rest on the lugs 37 so that the pockets 38 are exposed. In this position the fixture is ready to receive a replaceable element, such as an abrasive disk 50 shown in FIGS. 3, 3A and 4.

Figure 6:
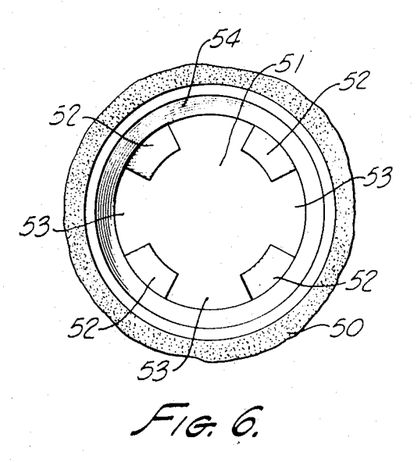
FIG. 6 is a view of the central portion of the disk to be mounted, this view being taken in the direction of the arrow 6 of FIG. 4.

The abrasive disk, as shown in FIGS. 3, 4 and 6, includes a central opening 51 having projections 52 separated by gaps 53. The projections 52 are of substantially the same width as the pockets 38 and it will be noted that the pockets 38 are somewhat narrower than the lugs 37. The opening projections and gaps are formed in a member having a conical-shaped portion 54, as shown best in FIGS. 3 and 4. An alternative form of disk is shown in FIG. 3A, in which figure there is a central opening 51A providing projections 52A separated by gaps 53A. In this form the opening, projections and gaps are not supported in a conical member but are in the plane of the disk.

To assemble the disk onto the fixture it is first positioned as shown in FIGS. 4 and 6 with the projections 52 in alignment with the pockets 38. With the disk in the position shown in FIG. 4 it is then moved horizontally to the right in order that the projections 52 will move into the pockets 38 and the conical-shaped portion 54 of the disk will move into the conical portion 41 of the supporting means 32.

Figure 8:
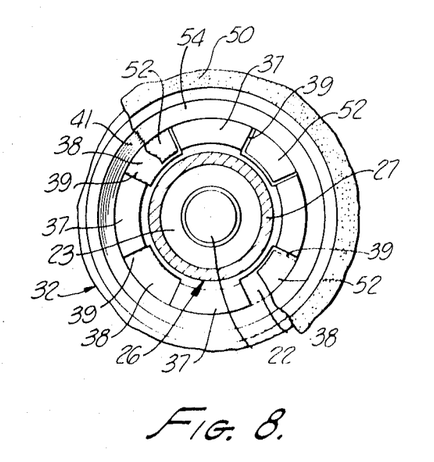
FIG. 8 is a sectional view taken along the line 8—8 of FIG. 7 and showing the projections of the disk as they are received in the pockets.

The parts are now in a position as shown in FIG. 8. It is to be noted that the clamping or gripping means is in section so as to show the projections 52 positioned in the pockets 38.

Figure 9:
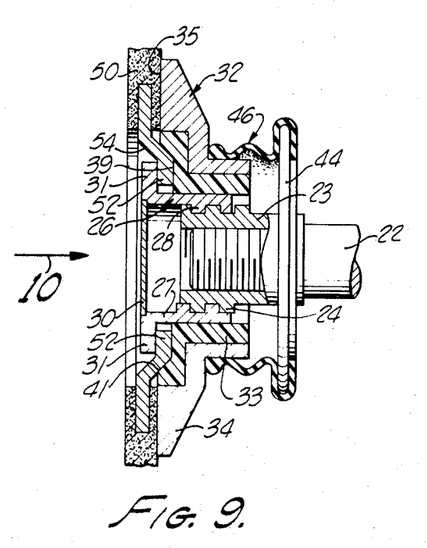
FIG. 9 is a sectional view showing the portions of the parts after the projections of the disk have been received in the pockets, and the disk and mounting hub having been rotated 45° with respect to the clamping or gripping means.
Figure 10:
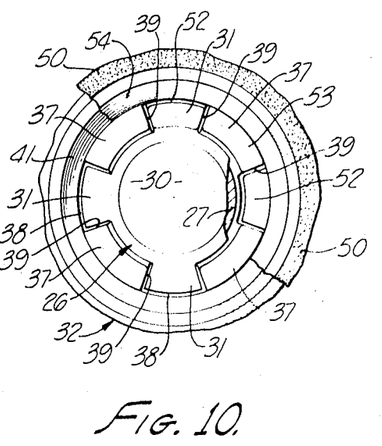
FIG. 10 is a face view taken in the direction of the arrow 10 of FIG. 9 of the mounting fixture with the disk in place and with the disk and supporting hub having been rotated 45° so that jaws of the clamping or gripping means are now positioned adjacent the pockets and are in contact with the projections of the disk.

To secure the disk in place the operator now rotates the disk 50 in an anti-clockwise direction. Because the projections are in the pockets they will engage the walls of the lugs 37 and cause the supporting means 32 to rotate with the disk. The disk and supporting hub are rotated 45° and into a position shown in FIGS. 9 and 10. The pockets which were previously exposed are now moved into a position behind the jaws 31, and because of the pressure of the spring means 46 the jaws will move axially into the outer parts of the pockets 38 and engage the projections 52 as clearly shown in FIG. 9. FIG. 10 clearly illustrates that the lugs 37 which were positioned behind the jaws 31 in FIG. 5 are now moved to align with the gaps 53 between the projections 52.

With the parts in this position the disk is held in place by being supported between the seating walls 39 and the jaws 31 with a pressure depending upon the force of the spring means 46, and at this time the operator may disengage his hand from the disk or hub. The operator may now start the motor which causes the shaft 21 and bushing 23 to rotate in an anti-clockwise direction relative to the supporting means and the disk due to inertia. This action feeds the clamping or gripping means in a leftward direction as shown in FIG. 11, until the supporting means engages the abutment 44. Further movement of the bushing 23 relative to the clamping or gripping means 26 now causes the jaws 31 to tightly clamp against the projections 52 with a force depending upon the force of inertia, and this results in securely holding the projections 52 against the seating walls 39, with the result that the disk is held solidly in place. As long as the motor is operating inertia will hold the parts as shown in FIG. 11, and, of course, when a sanding or grinding operation is performed this clamping or gripping force is increased because the engagement of the disk with the work exerts a resistance to rotation which, in turn, increases the force which acts to clamp the parts together.

Figure 7:
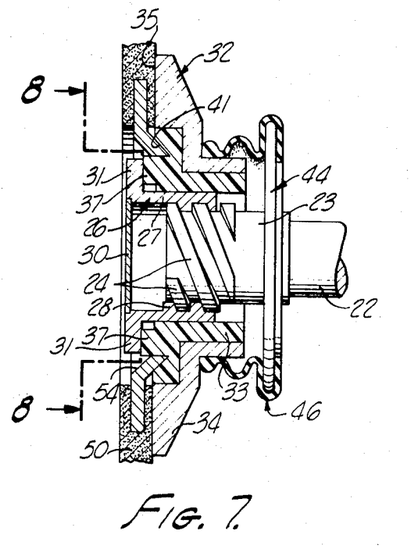
FIG. 7 is a cross-sectional view similar to FIG. 4, but showing the disk being mounted into mounting position.

When the motor is deenergized the shaft stops and the force of inertia drops to zero. The pressure of the spring against the supporting means 32 again returns the parts to the position shown in FIG. 9 and at this time the disk is retained in position by the spring force. If the operator again desires to use the grinding or sanding tool with the same disk in place he starts the motor and the clamping action previously described again occurs. If the operator desires to remove the sanding disk he manually engages the disk and exerts a force which will move the disk and supporting means so that the jaws are no longer in the pockets. He then rotates the disk and supporting means in a counterclockwise direction a distance of 45°. This has the action of moving the pockets from behind the jaws 31 and returning the jaws 31 into their first described positions on the lugs 37, as shown in FIGS. 5 and 7.

The pockets 38 are now uncovered and the disk may then be removed from the mounting fixture in a leftward direction, leaving the parts of the mounting device in the position shown in FIGS. 4 and 5, in which position they are ready to receive a grinding or sanding disk whenever the need requires it.

DESCRIPTION OF THE SECOND EMBODIMENT

In FIGS. 12 to 31 is disclosed a second form of my invention which differs from the first form in a number of respects and particularly by the inclusion of separate driving shoulders contained in the removal element or disk which are engageable by the jaws of the fixture whereby the removable element or disk is driven upon rotation of the shaft on which all of the parts are mounted.

In view of the similarity between many of the parts the similar elements in this second form of my invention will be given the same number with one hundred added. For example, shaft 22 of the first form will be identified as shaft 122 of the second form, etc.

This form of my invention provides a bushing 123 which is threadedly secured to the threaded end of shaft 122. This bushing 123 has triple threads 124 formed on its exterior cylindrical surface. The numeral 126 is a clamping or gripping element having a cylindrical portion 127 provided with triple threads 128 which mate with the threads 124. The open end of the clamping or gripping element is closed by a dust or dirt cover 130. The left end of the element 126 is provided with radially extending and equally spaced jaws 131.

Upon rotation of the clamping or gripping element 126 relative to the bushing 123, the element 126 will move axially along the bushing. The threads 124 and 128 are of a sufficiently long pitch that pressure on the element 126 will cause it to rotate and move in an axial direction relative to the shaft 122 Also, rotation of the shaft relative to the element 126 will cause axial movement of the element along the shaft. These threads constitute the means operable upon relative rotation of the supporting means and shaft and perform the same action and function as the similar parts of the first form of my invention.

Carried on the cylindrical portion 127 is a supporting means or supporting hub 132 having a sleeve 133 and a flange 134, the flange 134 having an outer cylindrical surface 134A which fits into a ring 134B of a mounting plate 134C. The mounting plate 134C has a yieldable body 134D being adapted for engagement by the sanding disk as will be described later. The removable backing plate has flexible elements 134E for yieldably locking it in place.

The supporting hub 132 has annularly placed lugs or seals 137 having angled faces 137A and 137B, which lugs are separated by annularly arranged pockets 138, which provide seating walls 139, and a surrounding conical cavity 141.

Figure 12:
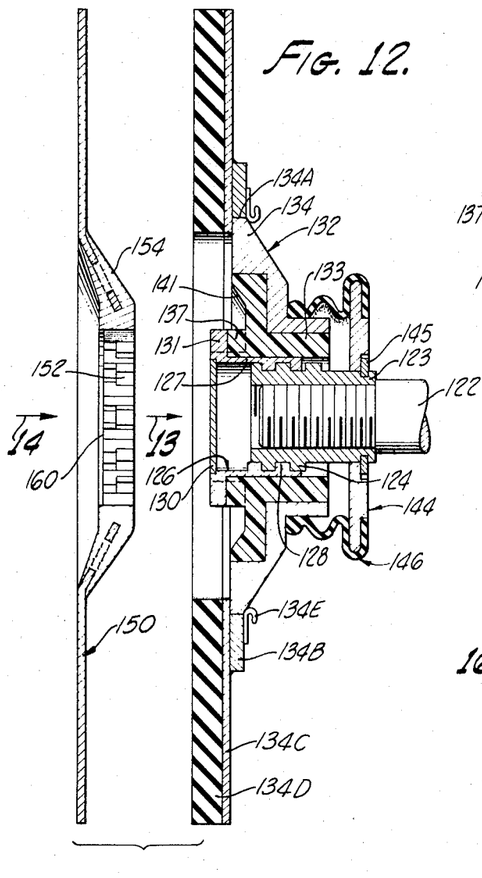
FIG. 12 is a vertical sectional view taken along the line 12—12 of FIG. 13, showing a second form of mounting fixture and replacement element or sanding or grinding disk of my invention, this view showing the grinding disk in a position ready to be assembled on the fixture.
Figure 13:
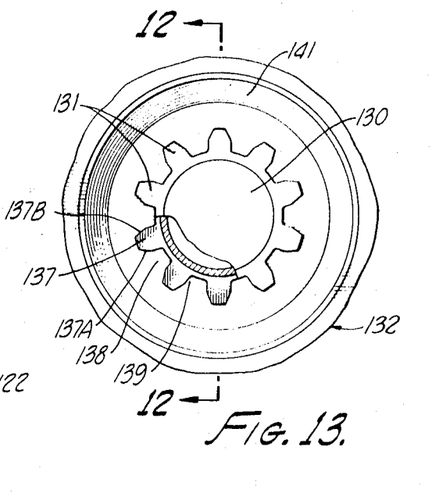
FIG. 13 is a fragmentary view taken in the direction of arrow 13 of FIG. 12.
Figure 14:
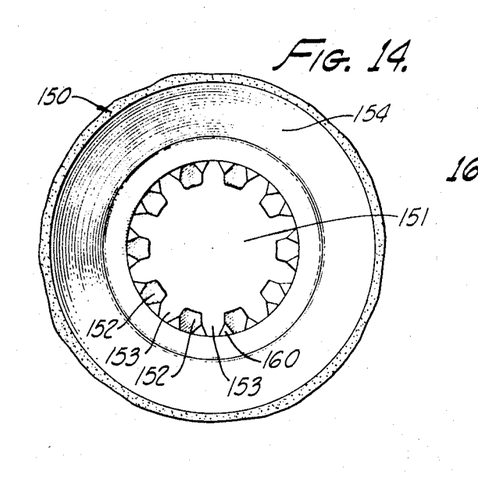
FIG. 14 is a fragmentary view taken in the direction of the arrow 14 of FIG. 12 and showing the annularly arranged projections and gaps and driving shoulders of the replaceable element or sanding disk.
Figures 16, 17, 18, 19, 20, 31:
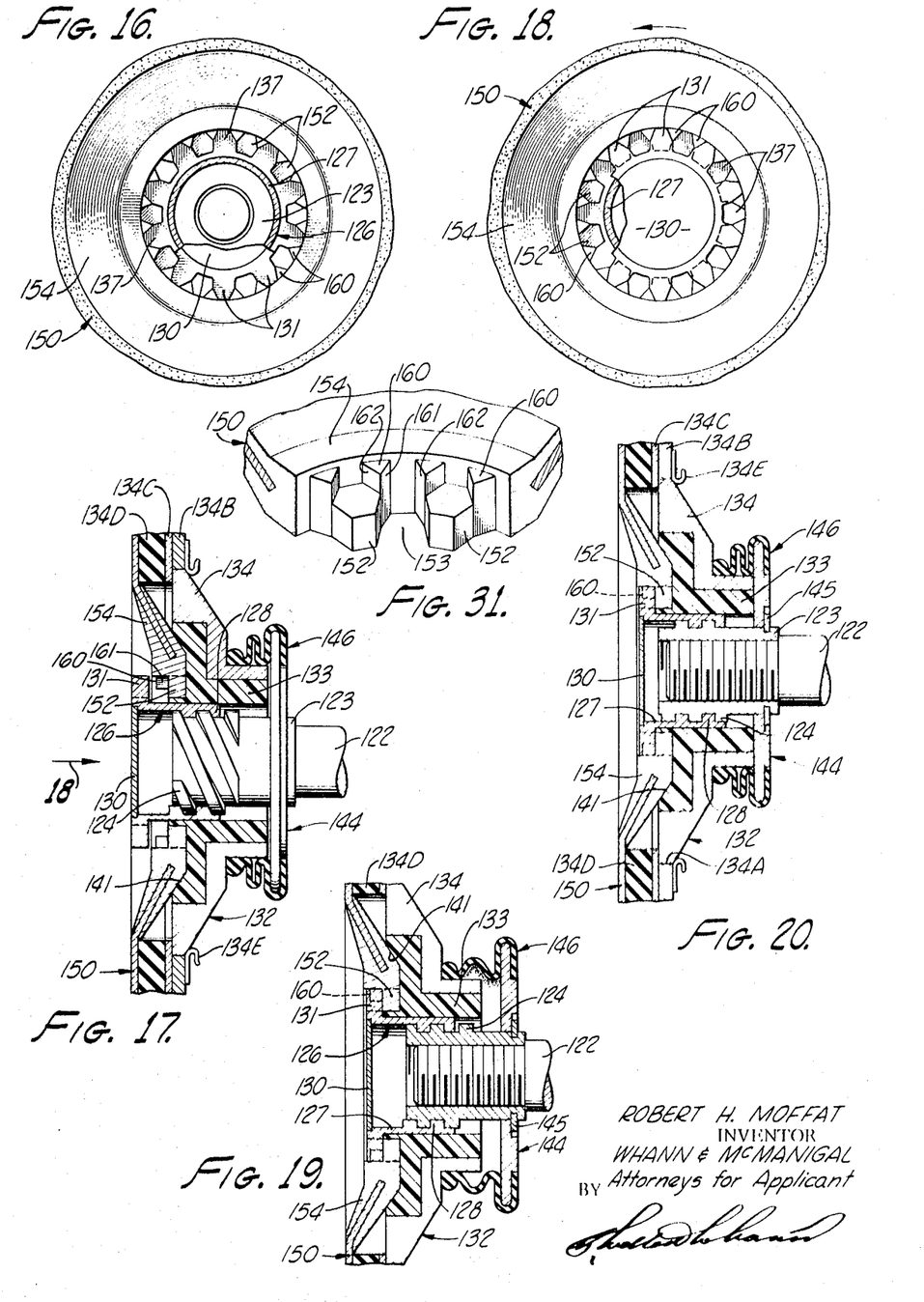
FIG. 16 is a view taken on the line 16—16 of FIG. 15.
FIG. 17 is a view similar to FIG. 15 showing the fixture and removable disk rotated relative to the jaws a distance equal to the size of one jaw member so as to bring the jaw into axial alignment with a projection on the disk.
FIG. 18 is a view taken in the direction of the arrow 18 of FIG. 17.
FIG. 19 is a view similar to FIG. 17 but showing the jaws in contact with the projections.
FIG. 20 is a view similar to FIG. 19 but showing the position of the parts after the rotary drive element or shaft has been put into rotation by energizing the driving member.
FIG. 31 is a fragmentary perspective view of the central portion of the disk showing the relationship between the projections and driving shoulders.
Figure 21:
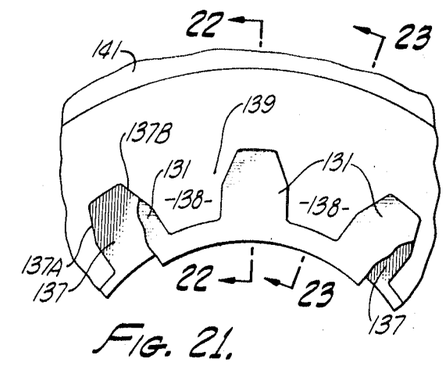
FIG. 21 is an enlarged fragmentary view showing the jaws and lugs in alignment with each other.
Figure 22:
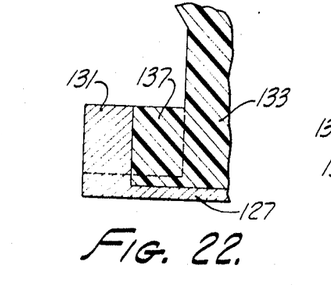
FIG. 22 is a sectional view taken along the line 22—22 of FIG. 21.
Figure 23:
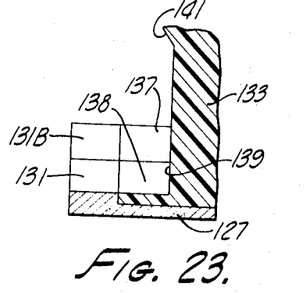
FIG. 23 is a sectional view taken along the line 23—23 of FIG. 21.

Secured to the right end of the bushing 123 is an abutment in the form of a radial plate 144, which is secured in place by a split washer 145. There is a rubber element 146 which is connected to the peripheral part of the abutment 144 and to the sleeve portion 133 of the supporting means 132, as shown, this rubber element comprising a spring and also an enclosure to keep foreign material away from the inner parts. If desired a metallic spring element could be used which could be molded in the rubber element or placed inside of it. The spring action of the element 146 exerts a force on the supporting means 132 in a leftward direction, which force is transferred through the lugs 132 to the clamping or gripping element 126. Because of the long pitch of the triple threads 124 and 128 the parts are resiliently retained in the position shown in FIG. 12 with the clamping or gripping element 126 in its most leftward position with respect to the bushing 123. The supporting means 132 is movable from a position spaced from the abutment 144, as shown in FIG. 12, into a position in which it engages the abutment 144 as shown in FIG. 20.

In the position shown in FIGS. 12, 13, 21, 22 and 23 the jaws 131 rest on the lugs 137 so that the pockets 138 are exposed. In this position the fixture is ready to receive a replaceable element, such as an abrasive disk 150 shown in FIGS. 12 and 13.

The abrasive disk, includes a central opening 151 having projections 152 separated by gaps 153. The projections and gaps are formed in a member having a conical-shaped portion 154, as shown best in FIG. 12. As shown in the various views and quite clearly in FIG. 31, this form of my invention provides driving means in the form of driving shoulders 160, which have angularly arranged faces or surfaces 161 and 162 which meet on a line which divides the projections 152 from the gaps 153. These faces 161 and 162 face in opposite directions and lie in a plane axially offset from the projections 152 and are adapted to be in driving engagement with the faces 131A and 131B of the jaws 131 when the parts are in the position shown in FIGS. 19, 20, 25, 29, and 30.

To assemble the disk onto the fixture it is first positioned as shown in FIGS. 12, 13, and 22 to 25 with the projections 152 in alignment with the pockets 138. With the disk in the position shown in these figures it is then moved horizontally to the right in order that the projections 152 will move into the pockets 138 and the conical-shaped portion 154 of the disk will move into the conical portion 141 of the supporting means 132.

Figure 24:
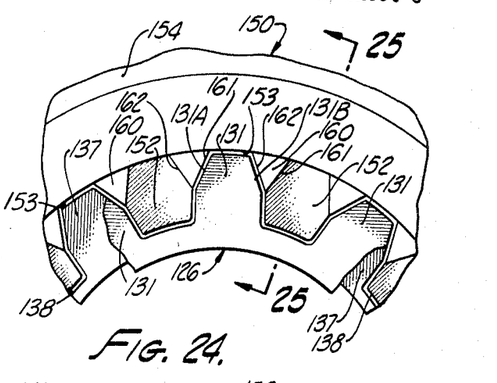
FIG. 24 is a view similar to FIG. 21 but showing the disk in place. For clarity the various elements are shown with a space between them in order that the various parts may be easily recognized, it being understood, however, in actual use the clearances between these parts are but a few thousandths of an inch.
Figure 25:
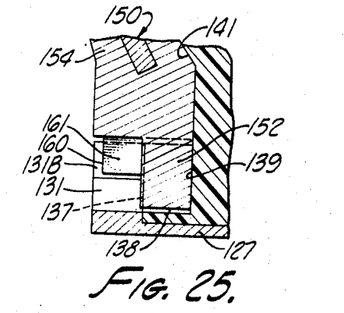
FIG. 25 is a sectional view taken along the line 25—25 of FIG. 24.

The parts are now in a position as shown in FIGS. 24 and 25, the enlarged view. It is to be noted that in FIG. 25 the projection is in section so as to show that it is positioned in the pockets 138.

To secure the disk in place the operator now rotates the disk 150 in an anti-clockwise direction. Because the projections are in the pockets they will engage the walls of the lugs 137 and cause the supporting means 132 to rotate with the disk. The disk and supporting hub are rotated an increment of one projection 152 and into a position shown in FIGS. 18, 27, and 28. The pockets which were previously exposed are now moved into a position behind the jaws 131, and because of the pressure of the spring means 146 the jaws when the disk is released will move axially into a position to engage the projections 152 as clearly shown in FIGS. 19 and 29.

Figure 15:
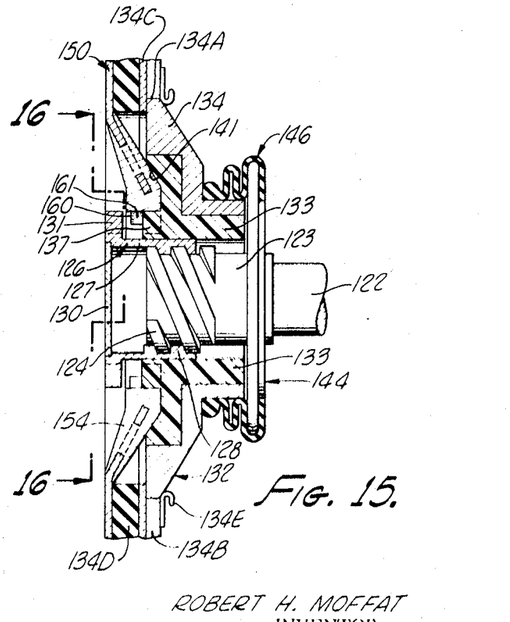
FIG. 15 is a sectional view similar to FIG. 12 but showing the disk assembled on the fixture in a "pushed back" position in which the jaws of the fixture are in an axial off-set position to permit relative rotation between parts as will be later described.
Figures 26, 27, 28, 29, 30:
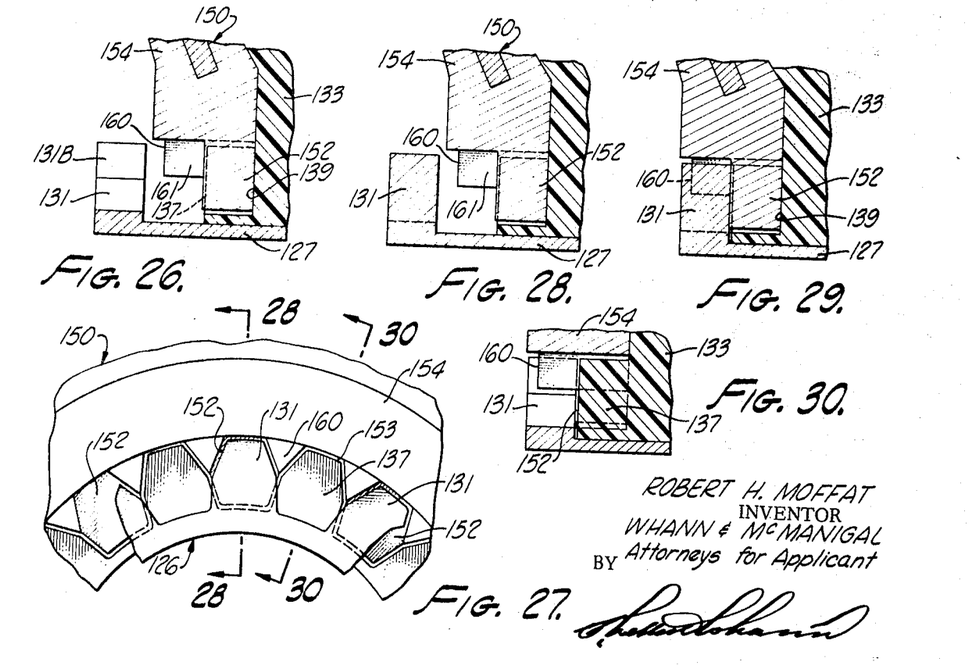
FIG. 26 is a fragmentary sectional view showing the parts in a position identical to that shown in FIG. 15.
FIG. 27 is a fragmentary face view of a portion of the fixture and disk showing the position of the parts after they have been rotated from a position shown in FIG. 15 into a position shown in FIG. 17.
FIG. 28 is a sectional view taken along the line 28—28 of FIG. 27.
FIG. 29 is a fragmentary view similar to FIG. 28 but showing the position of the parts when they have been released and when the jaw is in engagement with the projection.
FIG. 30 is a sectional view taken along the line 30—30 of FIG. 27 but with the parts released and in similar positions to that shown in FIG. 29.

It will be noted in various figures, such as 15 and 26, that pushing on the disk 150 causes the spring cover 146 to be compressed and causes the supporting hub 132 to be moved to the right relative to the clamping or gripping element 126.

This will position the jaws 131 axially to the left of the driving shoulders 160 so that there may be relative rotation between all of the parts with respect to the clamping or gripping element 126.

With the disk in the position just described the operator now rotates the disk in an anti-clockwise direction a distance equal to the width of the jaws or projections or lugs. Since the projections 152 are positioned in the gaps 138 between the lugs 137, the supporting hub rotates with the disk. The disk and supporting hub when rotated an increment of one projection 152 or jaw 131 moves the lugs from a position axially behind the jaws 131; and the jaws 131 are now in a position in axial alignment with the projections 152. The operator then releases the pressure on the disk and the spring 146 will then urge the parts into the position shown in FIG. 29 in which the jaws 131 engage the projections 152. FIG. 19 also shows the parts in this position.

When the parts are in this position the jaws 131 are moved into the same circumferential plane as the shoulders 160 and the inclined faces 161 and 162 and 131A and 131B may interengage each other in order to form a driving relationship between the gripping element 126 and the disk 150. With the parts in this positioning the disk is held in place by being supported between the seating wall 139 and the jaws 131 with a pressure depending upon the force of the spring means 146, and at this time the operator may disengage his hand from the disk or hub. The operator may now start the motor which will cause the shaft 121 and bushing 123 to rotate in an anti-clockwise direction relative to the supporting means and the disk, which relative rotation is due to inertia.

This movement feeds the clamping or gripping means in a leftward direction, as shown in FIG. 20, until the supporting means engages the abutment 144. The bushing is now securely clamped or gripped and is safely held in position on the supporting hub. The interengaging surfaces of the jaws 131 and the projections 152 are secured in operating position as shown in FIG. 20.

In the structure there is but a few thousandths clearance and upon starting the motor to rotate the shaft the interengaging faces of the jaws 131 and projections 152 are brought into pressural contact, and when the gripping action is applied the parts will be in their intended driving position.

When the sanding or grinding operation is being performed by the apparatus the clamping or gripping force is increased because the engagement of the disk with the work exerts a resistance to rotation which, in turn, increases the force which acts to clamp the parts together.

When the motor is deenergized the shaft stops and the force of inertia drops to zero. The pressure of the spring against the supporting means 132 again returns the parts to the position shown in FIG. 19 and at this time the disk is retained in position by the spring force. If the operator again desires to use the grinding or sanding tool with the same disk in place he starts the motor and the clamping action previously described again occurs. If the operator desires to remove the sanding disk he manually engages the disk and exerts a force which will move the disk and supporting means so that the jaws are no longer in the pockets. He then rotates the disk and supporting means in a counterclockwise direction a distance of one projection 152, or jaws 131. This has the action of moving the pockets from behind the jaws 131 and returning the jaws 131 into their first described positions on the lugs 137, as shown in FIG. 12.

The pockets 138 are now uncovered and the disk may then be removed from the mounting fixture in a leftward direction, leaving the parts of the mounting device in the position shown in FIG. 12, in which position they are ready to receive a grinding or sanding disk whenever the need requires it. The backing plate 134C is made removable in order that the fixture may be used in connection with a type of sanding disk which is relatively thick and stable and which does not require a backing plate to support it.

From the foregoing description of two embodiments of my invention it is obvious that various changes or modifications may be made without departing from the spirit and scope of my invention as defined in the appended claims.

I claim:

1. Apparatus for mounting a replacement element on a rotary drive element, the combination including:
   (a) a rotatable drive element;
   (b) gripping means supported from said rotary drive element;
   (c) supporting means carried from said rotary drive element having pockets provided with seating faces adapted to be engageable by portions of said replacement element and said gripping means having jaws to engage portions of said replacement element which are in engagement with said seating faces; and
   (d) means operable upon relative rotation of said rotary drive element and said gripping means for causing said jaws to clamp said portions of said replacement element against said seating faces.

2. A combination as defined in claim 1 in which said supporting means has lugs separating said pockets and in which said jaws rest on said lugs when said replacement element is being installed or removed from said apparatus.

3. A combination as defined in claim 2 including spring means for moving said gripping means from gripping position when said rotary drive element is not being rotated.

4. A combination as defined in claim 1 in which element (d) comprises long pitch spline or thread means which causes axial movement between said gripping means and said rotary drive element upon relative rotational movement between these parts.

5. A combination as defined in claim 4 in which there is a spring means engaging said supporting means and an abutment which does not move axially relative to said drive element said spring means holding said jaws in contact with said portions of said replacement element prior to the movement of said parts into clamping position as the result of the operation of element (d).

6. A combination as defined in claim 5 in which said abutment is engageable by said supporting means to restrain said supporting means from axial movement beyond a predetermined position.

7. Apparatus for mounting an abrasive disk on a rotary drive shaft, the combination including:
  (a) a bushing adapted to be secured to said rotary drive shaft;
  (b) clamping means supported by said bushing including a sleeve portion and radially outwardly projecting jaws;
  (c) supporting means carried by said sleeve having annularly arranged seat means adapted to be engaged by portions of said disk, said supporting means and said clamping means being relatively rotatable whereby said jaws may be positioned opposite to said seat means with portions of said disk interposed therebetween;
  (d) spring means adapted to cause relative axial movement between said supporting means and said clamping means in a direction to cause pressural engagement between said jaws, said portions of said disk and said seating means; and
  (e) means operative between said rotary drive shaft and said sleeve of said clamping means to cause said clamping means to move in a direction to clamp said disk against said supporting means.

8. A combination as defined in claim 7 in which said supporting means has lugs positioned between said seat means, said lugs being engageable by said jaws of said clamping means and movable upon relative rotation of said clamping means and supporting means to bring said jaws into contact with said portions of said disk.

9. A combination as defined in claim 6 in which said supporting means has seating means engageable by said replacement element, in which said gripping means has jaw means engageable with said replacement element, and in which said jaw means and said seating means upon operation of element (d) are moved axially toward each other to grip said replacement element.

10. In combination:
  (a) a replacement element adapted to be mounted on a rotary drive element, said replacement element having a plurality of spaced inwardly extending projections positioned around a central opening and a drive shoulder at a side of at least one of said projections;
  (b) support means for supporting said replacement element;
  (c) a rotary drive element on which said supporting means is carried; and
  (d) gripping means movable into a position to contact said drive shoulder of said replacement element so as to rotatably drive said replacement element.

11. A combination as defined in claim 10 in which said clamping means includes a plurality of circumferentially spaced jaws and said driving means includes a plurality of circumferentially spaced driving shoulders, each engageable with one of said jaws when said replacement element is in position to be driven by said spaced jaws.

12. A combination as defined in claim 11 in which there is a pair of driving shoulders positioned on each side of at least one of said projections.

13. A combination as defined by claim 10 in which said drive shoulder is positioned outwardly of pocket formed in said supporting means.

14. In a replacement element adapted to be replaceably mounted on a mounting fixture, the combination including:
  (a) a plurality of inwardly extending projections positioned around a central opening of the replacement element defining spaces therebetween, said projections being of substantially equal size to the spaces between them and the outer portions thereof being defined by non-radial walls; and
  (b) a plurality of driving shoulders positioned adjacent the outer portions of said projections adapted to rotatably drive the replacement element, said driving shoulders being non-radial and positioned in alignment with the non-radial walls of said projections.

15. In a replacement element adapted to be replaceably mounted on a mounting fixture, the combination including:
  (a) a cylindrical wall forming a cylindrical opening;
  (b) spaced projections extending inwardly from said cylindrical wall, there being spaces between said projections; and
  (c) a pair of oppositely facing driving shoulders adjacent each of said projections, said shoulders projecting inwardly from said cylindrical wall and being axially offset from said projections and said spaces.

References Cited

UNITED STATES PATENTS

| | | | |
|---|---|---|---|
| 1,736,098 | 11/1929 | Stever | 51—377 |
| 2,402,691 | 6/1946 | Stever | 51—379 |
| 2,480,886 | 9/1949 | Stever | 51—379 |
| 2,789,402 | 4/1957 | Tocci-Guilbert et al. | 51—377 |
| 3,315,420 | 4/1967 | Moberg | 51—378 |
| 3,360,890 | 1/1968 | Dooley | 51—378 |

OTHELL, M. SIMPSON, Primary Examiner